(12) United States Patent
Gorin et al.

(10) Patent No.: US 12,483,584 B2
(45) Date of Patent: Nov. 25, 2025

(54) SYSTEM AND METHOD THEREOF FOR AGENTLESS MONITORING OF THIRD-PARTY APPLICATIONS

(71) Applicant: Zscaler, Inc., San Jose, CA (US)

(72) Inventors: Boris Gorin, Herzliya (IL); Niv Steingarten, Herzliya (IL)

(73) Assignee: Zscaler, Inc., San Jose, CA (US)

( * ) Notice: Subject to any disclaimer, the term of this patent is extended or adjusted under 35 U.S.C. 154(b) by 246 days.

(21) Appl. No.: 17/817,779

(22) Filed: Aug. 5, 2022

(65) Prior Publication Data

US 2023/0171246 A1    Jun. 1, 2023

Related U.S. Application Data

(60) Provisional application No. 63/283,658, filed on Nov. 29, 2021, provisional application No. 63/283,651, filed on Nov. 29, 2021.

(51) Int. Cl.
| | |
|---|---|
| *H04L 9/40* | (2022.01) |
| *G06F 15/16* | (2006.01) |
| *G06F 16/22* | (2019.01) |
| *H04L 15/16* | (2006.01) |
| *H04L 67/10* | (2022.01) |

(52) U.S. Cl.
CPC ........ *H04L 63/1433* (2013.01); *H04L 63/083* (2013.01); *H04L 67/10* (2013.01)

(58) Field of Classification Search
CPC ... H04L 63/1433; H04L 63/083; H04L 67/10; H04L 63/1408; H04L 63/1416; H04L 63/1425; H04L 63/1441; H04L 63/20; H04L 67/535

USPC .............................................................. 726/4
See application file for complete search history.

(56) References Cited

U.S. PATENT DOCUMENTS

| | | | | |
|---|---|---|---|---|
| 2013/0080641 A1* | 3/2013 | Lui | ........................ | H04L 47/70 |
| | | | | 709/226 |
| 2013/0111018 A1* | 5/2013 | Ammons | ............ | G06F 9/45558 |
| | | | | 709/224 |
| 2015/0263943 A1* | 9/2015 | Sonoda | .................... | H04L 45/70 |
| | | | | 370/392 |
| 2015/0358338 A1* | 12/2015 | Zeitlin | ................ | H04L 63/1416 |
| | | | | 726/23 |
| 2016/0269482 A1* | 9/2016 | Jamjoom | ................. | H04L 49/70 |
| 2016/0301779 A1* | 10/2016 | Cui | ........................ | H04L 45/566 |
| 2017/0251010 A1* | 8/2017 | Irimie | ..................... | H04L 63/20 |
| 2017/0302521 A1* | 10/2017 | Lui | ........................ | G06F 9/505 |

(Continued)

FOREIGN PATENT DOCUMENTS

EP            3660718 A1 *  6/2020    ......... H04L 63/1425

*Primary Examiner* — Emmanuel L Moise
*Assistant Examiner* — Berhanu Shitayewoldetadik
(74) *Attorney, Agent, or Firm* — Baratta Law PLLC; Lawrence A. Baratta, Jr.

(57) ABSTRACT

A method for agentless monitoring of third-party applications is disclosed. The method includes: initiating by a monitoring agentless application (MAA) executing on a computer a service instance in a cloud-based computing environment of a software as a service (SaaS); providing, to a third-party application by the MAA, application access credentials for use in accessing the service instance; and extracting, by the MAA, behavior data from the service instance based on at least an action performed by the third-party application in the service instance.

18 Claims, 3 Drawing Sheets

(56) References Cited

U.S. PATENT DOCUMENTS

| | | | |
|---|---|---|---|
| 2018/0131685 A1* | 5/2018 | Sridhar | H04L 9/3226 |
| 2018/0287903 A1* | 10/2018 | Joshi | H04L 43/062 |
| 2019/0163925 A1* | 5/2019 | Jiang | G06Q 20/405 |
| 2019/0327259 A1* | 10/2019 | DeFelice | G06N 7/01 |
| 2019/0349316 A1* | 11/2019 | Yuan | H04L 49/208 |
| 2020/0008044 A1* | 1/2020 | Poornachandran | H04L 41/5019 |
| 2020/0044926 A1* | 2/2020 | Lui | H04L 43/065 |
| 2020/0334019 A1* | 10/2020 | Bosworth | G06F 8/34 |
| 2020/0379812 A1* | 12/2020 | Ranjan | G06F 9/5077 |
| 2022/0029880 A1* | 1/2022 | Feiguine | H04L 63/08 |
| 2022/0078210 A1* | 3/2022 | Crabtree | G06F 16/9024 |
| 2022/0109662 A1* | 4/2022 | Jenkins | H04W 12/35 |
| 2022/0167262 A1* | 5/2022 | Ding | H04L 67/55 |
| 2022/0232025 A1* | 7/2022 | Kapoor | H04L 63/1425 |
| 2022/0353139 A1* | 11/2022 | Brems | H04L 67/53 |

\* cited by examiner

SYSTEM AND METHOD THEREOF FOR AGENTLESS MONITORING OF THIRD-PARTY APPLICATIONS

CROSS-REFERENCE TO RELATED APPLICATIONS

This application claims benefit of U.S. Provisional Application No. 63/283,651 filed Nov. 29, 2021, and U.S. Provisional Application No. 63/283,658, also filed Nov. 29, 2021, both of which are herein incorporated by reference.

TECHNICAL FIELD

This disclosure generally relates to cyber security, and more particularly to a system and methods thereof for agentless monitoring of third-party applications.

BACKGROUND

Small and medium-sized enterprises (SMEs) and large enterprises hold sensitive and confidential information related to their business, clients, and the like. The information is sometimes stored in simple folders in a computerized environment, such as an enterprise network.

Nowadays, as enterprises get bigger, their systems and networks are more and more exposed to cyberthreats. According to Kaspersky over 300,000 different malware variants are detected in a single day.

One known technique for preventing cyberthreats is using a sandbox. A sandbox is a system for malware detection that runs a suspicious object in a virtual machine (VM), or other virtual workload, with a fully featured OS and detects the object's malicious activity by analyzing its behavior. If the object performs malicious actions in a VM, the system detects it as malware. Sandboxes are isolated from the real business infrastructure. Sandboxes are used to analyze the behavior of an object as it executes, which makes them effective against malware that escapes static analysis. At the same time, compared to other behavior analysis designs, a sandbox is safer as it doesn't risk running a suspicious object in the real business infrastructure.

A sandbox solution requires some code or executable file which is executed in the sandbox environment. If no code or executable file is available, the sandbox environment is ineffective at detecting the threat. Software as a service (SaaS) add-ons are one such example.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for agentless monitoring of third-party applications. The method comprises: initiating by a monitoring agentless application (MAA) executing on a computer a service instance in a cloud-based computing environment of a software as a service (SaaS); providing, to a third-party application by the MAA, application access credentials for use in accessing the service instance; and extracting, by the MAA, behavior data from the service instance based on at least an action performed by the third-party application in the service instance.

Certain embodiments disclosed herein include a non-transitory computer readable medium having stored thereon instructions for causing a processing circuitry to execute a process for agentless monitoring of third-party applications, the process comprising: initiating by a monitoring agentless application (MAA) executing on a computer a service instance in a cloud-based computing environment of a software as a service (SaaS); providing, to a third-party application by the MAA, application access credentials for use in accessing the service instance; and extracting, by the MAA, behavior data from the service instance based on at least an action performed by the third-party application in the service instance.

Certain embodiments disclosed herein also include a system for agentless monitoring of third-party applications. The system comprises: a processing circuitry; and a memory, the memory containing instructions that, when executed by the processing circuitry, configure the system to: initiate, by a monitoring agentless application (MAA), a service instance in a cloud-based computing environment of a software as a service (SaaS); provide, to a third-party application by the MAA, application access credentials for use in accessing the service instance; and extract by the MAA, behavior data from the service instance based on at least an action performed by the third-party application in the service instance.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

A method for agentless monitoring of third-party applications. The method includes: initiating by a monitoring agentless application (MAA) executing on a computer a service instance in a cloud-based computing environment of a software as a service (SaaS); providing, to a third-party application by the MAA, application access credentials for use in accessing the service instance; and extracting, by the MAA, behavior data from the service instance based on at least an action performed by the third-party application in the service instance.

Figure 1:
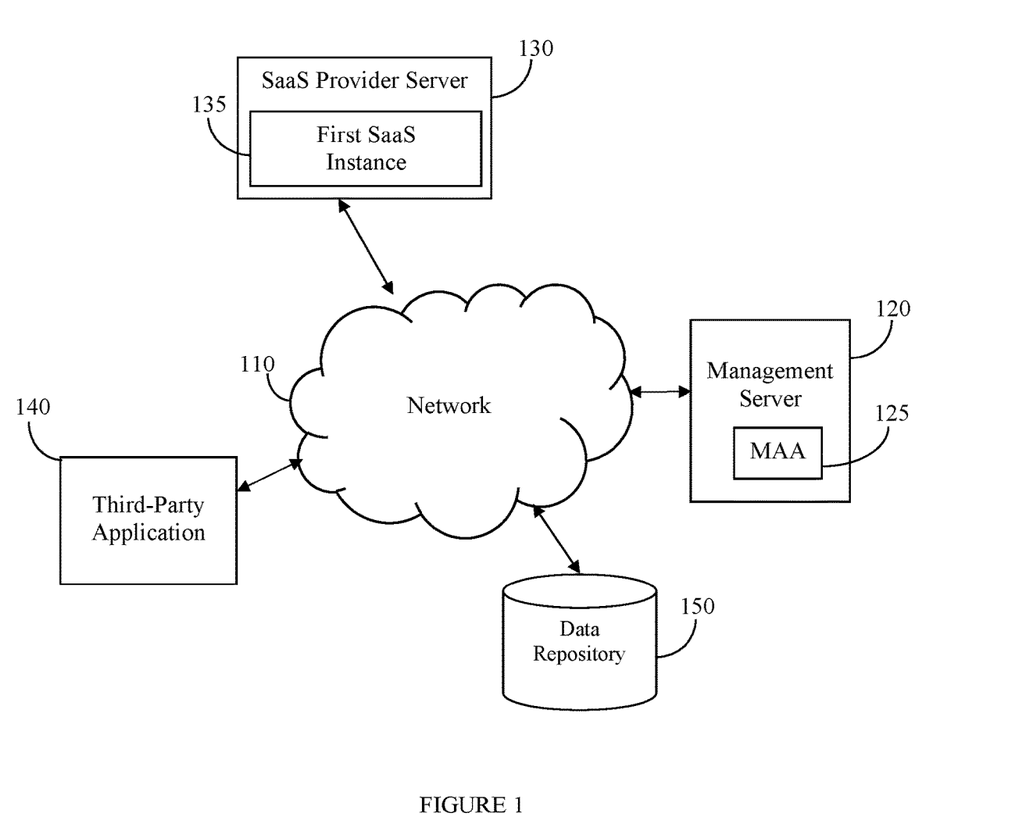
FIG. 1—is schematic diagram of a computing architecture utilized to describe the various embodiments disclosed herein.

FIG. 1 is a network diagram of a computing architecture utilized according to various disclosed embodiments. In the example network diagram 100, a management server 120, a monitoring agentless application (MAA) 125, a software as a service (SaaS) provider server 130, a first SaaS instance 135, a third-party application 140 and a data repository 150 are communicatively connected via a network 110. The network 110 may be but is not limited to, a wireless network, a local area network (LAN), a wide area network (WAN), the worldwide web (WWW), the Internet, similar networks, and any combinations thereof.

The management server 120 is a computing component that may include a combination of hardware layer and a software layer. The management server 120 may be configured to cause execution of actions as further discussed herein below. The components of the management server 120 are described in more detail with respect to FIG. 2.

The monitoring agentless application 125 is a software that is used for detecting and monitoring actions that have been performed by a third-party application in an instance of the SaaS, as further described herein below.

The SaaS provider server 130 is a computing environment which provides a software service, such as customer relationship management (CRM), identity and access management (IAM), etc. SaaS is a software licensing and delivery model in which software is licensed on a subscription basis and is centrally hosted. SaaS is also known as web-based or web-hosted software. SaaS applications are typically accessed by users using a thin client, e.g., via a web browser. Users usually provide user information when creating a new user account (e.g., when signing in). User information may include for example, name, address, email address, telephone number, age, and the like. A SaaS provider may be for example and without limitation, Facebook®, Google®, Salesforce®, and the like. While SaaS providers provide services such as web mail, customer relationship management (CRM), identity management, etc., third-party applications (i.e., SaaS add-ons) provide services on top of the services provided by the SaaS provider such as, email arrangement services on top of web mail service, CRM business insights services on top of CRM service, and so on.

The SaaS instance 135 is an application environment of a SaaS provider that is created for and associated with a unique entity (e.g., a user account, service account, and the like). The SaaS instance 135 may be implemented as a container operating in a cluster deployed by the SaaS provider server 130. For example, a specific user account at Gmail® is a SaaS instance.

The third-party application 140 may be associated with a third-party entity which may provide a legitimate service or try to run malicious processes within a computerized environment. The third-party application 140 may be referred to as a SaaS add-on. As opposed to other many different types of malicious activities, malicious applications, malicious files, or the like, the third-party application 140 is not downloaded to a computer, a server, or any other similar environments. As further discussed herein below, the third-party application 140 may receive access credentials to access an instance of a SaaS. Thus, using the abovementioned monitoring agentless application 125, which creates a simulated SaaS instance and is configured to monitor actions that are associated with or performed by the third-party application, behavior data associated with the third-party application 140 can be extracted and monitored in a supervised environment. Behavior data is the representation of the activities performed by, or with respect to, the third-party application 140. Behavior data may also include behavior information. The behavior data may be indicative of, for example, communications and interactions occurred between the third-party application and at least a principal or a resource, such as simulated databases, a simulated e-mail accounts, simulated files, and the like. The third-party application 140 may be a SaaS add-on, such as a SaaS add-on to a webmail service, such as Gmail, a SaaS add-on to a CRM service, such as Salesforce, etc. The third-party application 140 receives access to the first SaaS instance 135 after a user provides for example, sign in or login information (e.g., username and password) through one of the SaaS providers in which the user has an account. The SaaS provider provides the third-party application with access permissions to access resources and data which the SaaS provider stores.

The data repository 150 may be communicatively coupled with the management server 120 via the network 110 or embedded within the management server 120. The data repository 150 may be for example, a storage device containing thereon a database (e.g., a graph DB, a relational DB), a data warehouse, and the like, that may be used for storing simulated information (e.g., to be deployed at the first SaaS instance), records of behavior data of the third-party application (e.g., monitor log), and the like.

Figure 2:
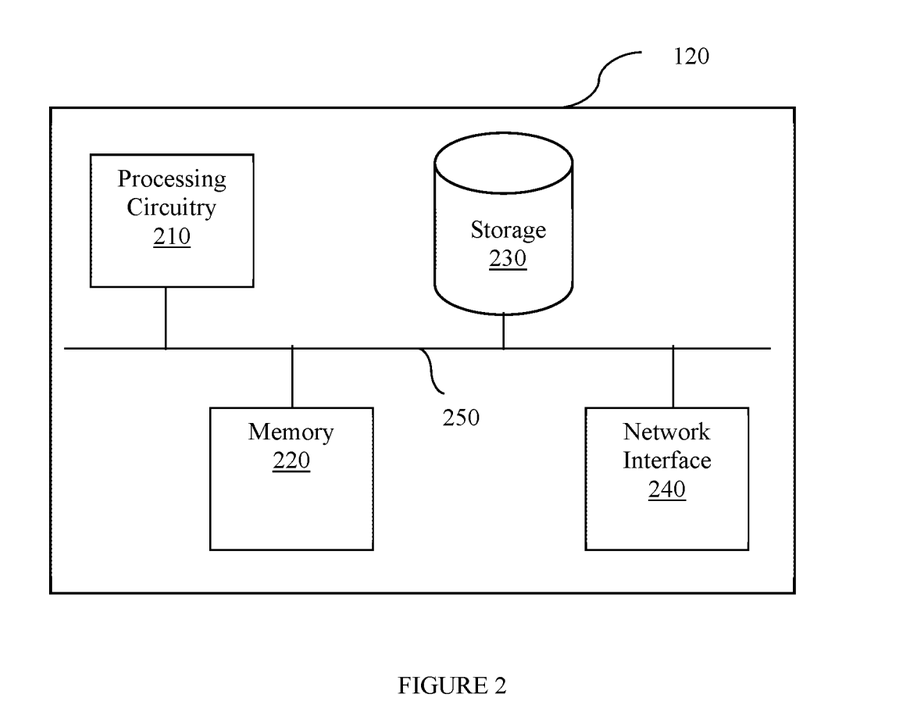
FIG. 2—schematic diagram of a management server according to an embodiment.

In an embodiment, and as further described in greater detail with respect of FIG. 2, the monitoring agentless application (MAA) 125 initiates a first instance of a software as a service (SaaS) in a cloud-based computing environment of the SaaS. For example, the MAA 125 provides user name and email for signing in and create a new user account at the SaaS provider platform (e.g., Gmail). A third-party application (e.g., SaaS add-on) is provided, by the MAA 125, with access credentials (e.g., user name and password) to access the first SaaS instance. The MAA 125 generates simulated information such as, simulated folders, simulated files, simulated resources (e.g., databases), etc., and deploys the simulated information in the first SaaS instance. Thus, by providing the third-party application 125 with access entitlements to access resources and data the first SaaS instance stores, behavior data of the third-party application may be extracted from the first instance based on at least an action performed by the third-party application in the first instance. As a non-limiting example, the behavior data may indicate how frequently the third-party application 140 collects data, which part of the simulated information was triggered (e.g., file that was opened or downloaded) whether or not the third-party application 140 created new keys, changed configuration, and so on.

FIG. 2 is an example schematic diagram of a management server 120 according to an embodiment. The management server 120 includes a processing circuitry 210 coupled to a memory 220, a storage 230, and a network interface 240. In an embodiment, the components of the management server 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, software for implementing one or more embodiments disclosed herein may be stored in the storage 230. In another configuration, the memory 220 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, cause the processing circuitry 210 to perform the various processes described herein.

The storage 230 may be a magnetic storage, a solid-state storage, an optical storage, and the like, and may be realized, for example, as flash memory or other memory technology, or any other medium which can be used to store the desired information.

The network interface 240 allows the management server 120 to communicate with, for example, the components of the computing architecture of FIG. 1 (e.g., the SaaS provider server 130, the third-party application 140, the data repository 150) for the purpose of, for example, transmitting data, receiving data, or the like. It should be understood that the embodiments described herein are not limited to the specific architecture illustrated in FIG. 2, and other architectures may be equally used without departing from the scope of the disclosed embodiments.

In an embodiment, the management server 120 is configured to generate a monitoring agentless application (MAA), e.g., the monitoring agentless application 125 of FIG. 1. The MAA 125 may include simulated folders, simulated files, simulated databases, simulated user accounts, simulated email accounts, simulated email messages, and the like. The management server 120 may receive a request (e.g., from an operator) to generate the MAA 125. In an embodiment, the management server 120 may execute, for example, a predetermined code that is adapted to generate the MAA 125 and the simulated resources and information the MAA 125 comprises.

Figure 3:
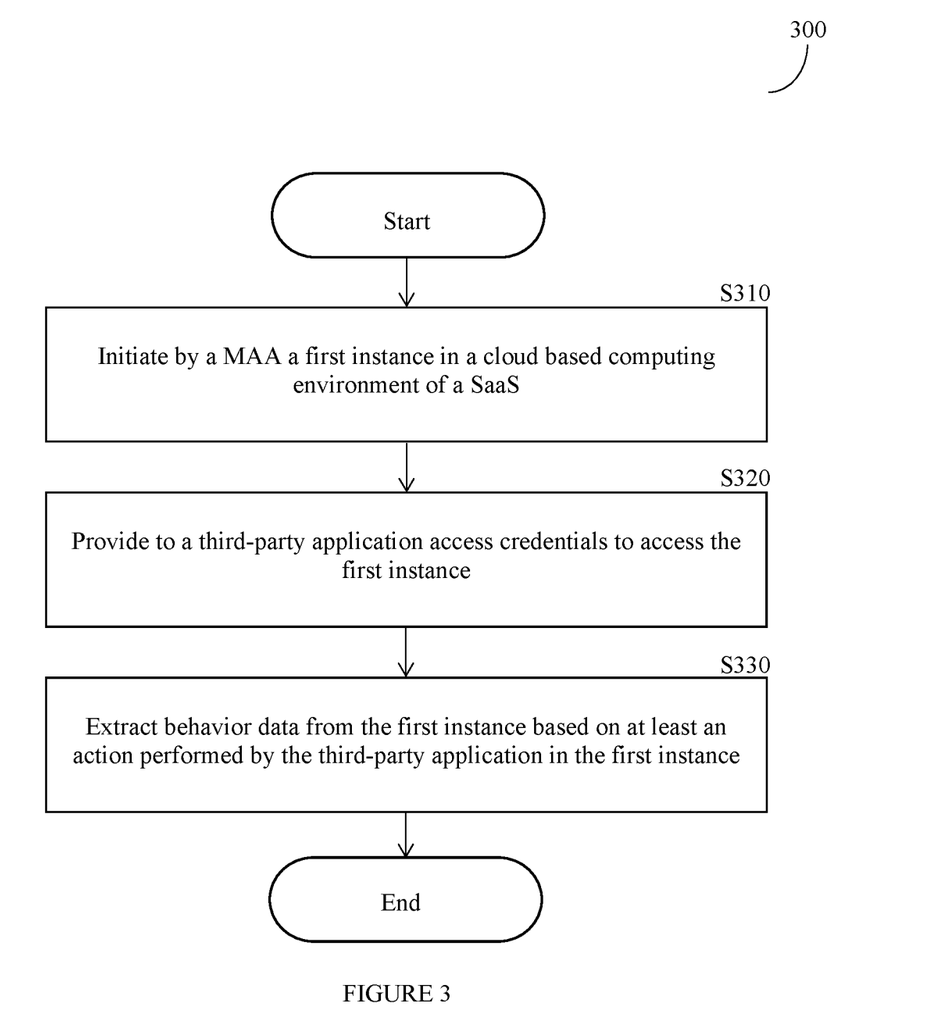
FIG. 3—is a flowchart of a method for agentless monitoring of third-party applications.

FIG. 3 is an example flowchart 300 of a method for agentless monitoring of third-party applications according to an embodiment. The method described herein may be executed by the monitoring agentless application (MAA) 125 of FIG. 1.

At S310, the monitoring agentless application (MAA) 125 initiates a first software as a service (SaaS) instance 135 in a cloud-based computing environment of a SaaS provider. It should be noted that the SaaS instance may be previously initiated by, for example, the management server 120, an initiating server (not shown), or any other similar computing device. As noted above, SaaS is a software licensing and delivery model in which software is licensed on a subscription basis and is centrally hosted. SaaS is also known as web-based or web-hosted software. For example, a SaaS provider may be for example and without limitation, Facebook®, Google®, Salesforce®, and the like. SaaS applications are typically accessed by users using a thin client, e.g., via a web browser. The SaaS instance 135 is an application environment of a SaaS provider that is created for and associated with a unique entity (e.g., a user account, service account, and the like). The SaaS instance 135 may be implemented as a container operating in a cluster deployed by the SaaS provider server 130. For example, a specific user account at Salesforce® is a SaaS instance, an organization account of a business or a company is a SaaS instance, and so on. The MAA 125 may communicate with the SaaS provider server 130 via an application programing interface (API) for the purpose of initiating the first instance of the SaaS.

For example, a specific user account at Gmail® may be referred to as a SaaS instance. In an embodiment, initiating the first SaaS instance 135 includes generating by the MAA 125 simulated information and resources for the first SaaS instance. Generating simulated information and resources may include generating simulated files, simulated email messages, simulated documents, simulated contacts' lists, simulated databases, simulated email accounts, and the like, and place the simulated information in different workloads (e.g., nodes, database, virtual machines) in order to simulate an authentic computerized environment. It should be noted that generating the simulated information may also include generating and placing content in documents, files, messages, etc. such that the simulated information may be authentic as possible. For example, the content of a certain simulated file may be generated based on the name of the folder in which the file is stored. However, the simulated information does not include confidential or sensitive information. By generating the simulated information for the first SaaS instance 135 (i.e., for the monitored cloud-based environment), an environment which imitates an authentic cloud-based environment is created. As a non-limiting example, initiating the first SaaS instance may include generating and placing in one or more workloads simulated information that imitates a computerized enterprise network which includes 4,000 email accounts, 500,000 email messages, 20,000 folders, 300,000 files, 3 databases, and so on. In a further embodiment, generating the simulated information may also include generating one or more bots. A bot is software program that operates automatically and performs for example, repetitive tasks, artificial intelligence (AI) based tasks simulating human actions, randomly generated tasks, and so on. The bots may be configured to communicate (e.g., send and receive data) with each other, with other sources (e.g., databases), etc. in order to imitate an authentic computerized cloud-based environment.

At S320, a third-party application (e.g., the third-party application 140 of FIG. 1) receives access credentials to access the first SaaS instance 135. Access credentials may include for example, username, password, hashed password, token, and the like. In an embodiment, the MAA 125 communicates with the third-party application 140 and provides the access credentials to the third-party application 140. The third-party application 140 may be referred to as a SaaS add-on. As opposed to other many different types of malicious activities, malicious applications, malicious files, or the like, the third-party application 140 is not downloaded to a computer, a server, or any other similar environments. The third-party application 140 may be a SaaS add-on, such as a SaaS add-on to Gmail, a SaaS add-on to Salesforce, etc.

Generally, agentless third-party applications (i.e., SaaS add-on) receive access to user's data and/or environment after a user provides sign in or login information (e.g., username and password) through one of the SaaS providers in which the user has an account. According to one embodiment of the disclosed system and method, the MAA 125 creates the first SaaS instance 135 using the SaaS provider cloud-based environment by providing the SaaS provider server 130 with, for example, sign in or login information (e.g., username and password). Thus, when the third-party application 140 receives the access credentials to access the first SaaS instance 135, the SaaS provider server 130 provides the third-party application 140 with access entitlements to access resources and data which the SaaS provider server 130 stores.

In an embodiment, providing the access credentials may be achieved by providing, e.g., by the MAA 125, to a SaaS provider server 130 sign in or login information, which simulates authentic user sign in or login information, and a unique authentication token that is generated by the SaaS provider server 130 with respect to a specific third-party application (e.g., SaaS add-on). Thus, the third-party application 140 receives access entitlements to access resources and data which the SaaS provider server 130 stores.

For example, a SaaS add-on (e.g., the third-party application 140) presents a login screen by which login can be performed using a user Google® account. Then, the MAA 125 inserts user sign in or login information (that is associated with a simulated user) such as username and password, or hashed password, in the corresponded fields. According to the same example, the SaaS add-on may previously request and receive a unique authentication token from the SaaS provider server, Google. The unique authentication token allows the SaaS provider server to verify the identity of the specific add-on (i.e., third-party application) when the add-on sends a request to access to user information stored in Google.

At S330, behavior data is extracted from the first SaaS instance 135 based on at least an action that is associated with or performed by the third-party application 140 in the first instance. As noted above, the first instance is a cloud-based environment that is created, controlled and monitored by the MAA 125. Therefore, the actions performed by the third-party application 140 may be identified rapidly and accurately. It should be noted, the first SaaS instance is isolated from an authentic cloud-based computing environment (e.g., real organization cloud-based computing environment), and therefore the task of monitoring the actions and interaction performed by and/or associated with the SaaS add-on (i.e., the third-party application 140) in the first SaaS instance, may consume less processing efforts and therefore save precious processing time. Behavior data is the representation of the activities performed by, or with respect to, the third-party application 140 (e.g., SaaS add-on). Behavior data may also include behavior information. The behavior data may be indicative of, for example, communications and interactions occurred between the third-party application 140 and at least a principal or a resource such as simulated databases, a simulated e-mail accounts, simulated files, and the like. That is, when the third-party application 140 receives access to the first SaaS instance 135 (which includes simulated resources and information that is generated by the MAA 125), the third-party application 140 may perform many actions, such as for example and without limitation, open simulated folders, open simulated files, read simulated information, write information into simulated files, communicate with simulated databases and endpoint devices, and the like. In an embodiment, the behavior data may be referred to as interactions performed between the third-party application 140 and one or more workloads (e.g., databases, nodes, user accounts, etc.). Monitoring the behavior data may be achieved by extracting, using the MAA 125, information from, for example, login logs, audit log, diff module, and the like. In a further embodiment, extracting behavior data may be performed using, for example, a packet analyzer (e.g., a sniffer which is a computer software for intercepting traffic of a network), a scraper, and the like. It should be noted that by extracting the behavior data associated with the third-party application 140, IP addresses, proxy network, etc. that are associated with the third-party application 140 may be detected.

According to another embodiment, a monitor log that contains the behavior data may be generated by, e.g., the MAA 125. The generated monitor log may include a textual summary of the actions and interactions performed by the third-party application 140 (e.g., SaaS add-on) and/or between the third-party application 140 and one or more principals and resources, in the first SaaS instance 135. According to one embodiment, the generated monitor log may include a portion of the information that was extracted from, for example, login logs, audit log, diff module, or the like. The monitor log facilitates determination of the actions and interaction that has been executed by the third-party application 140 (e.g., SaaS add-on) in the first SaaS instance 135.

The monitor log may include behavior data that may be indicative of: (a) from where the third-party application 140 communicates (e.g., based on IP address); (b) which entity developed the third-party application 140; (c) which entity owns the third-party application 140; (d) where is the server that operates the third-party application 140 located; (e) which type of data the third-party application 140 collects; (f) how frequently the third-party application 140 collects data; (g) the identity of the entity that operates the third-party application 140 (e.g., script, browser, bot, code, and the like); (h) which of the simulated information was triggered (e.g., opened, saved, etc.) by the third-party application 140; (i) whether or not the third-party application 140 created new keys, changed configuration, performed lateral movements within the monitored cloud-based environment of the first SaaS instance 135, and so on. It should be noted that the aforementioned list only describes few examples of behavior data items and many other behavior data items may be detected based on monitoring the behavior data without departing from the scope of the disclosure.

In an embodiment, the monitor log may be stored in a data repository (e.g., the data repository 150). As noted above, the stored monitor log may include textual representation of the behavior data which may be used for detecting, for example, suspicious patterns in the behavior data, similar behavior data that may be detected in other computerized environments (e.g., in different companies), and so on. For example, the monitor log of a first third-party application (e.g., SaaS add-on) indicates that the frequency with which the third-party application communicates with simulated workloads (e.g., simulated databases and simulated endpoint devices) in the first SaaS instance, is relatively high compared to an average frequency measured with respect to 1,000 different agentless third-party applications having at least 8 similar attributes. It should be noted that in order to determine that a suspicious behavior, pattern, etc. is detected, multiple parameters (and their values) of the behavior data may be analyzed and crosschecked.

According to a further embodiment, the third-party application (e.g., SaaS add-on) may be associated with at least a first cluster of a plurality of clusters of agentless third-party applications based on the monitored behavior data. Each of the plurality of clusters may be differentiated based on, for example, (a) type of the agentless third-party applications (e.g., entertainment, utility, educational); (b) common developer of the agentless third-party applications; (c) common current owner of the agentless third-party applications, and so on.

In a further embodiment, the clusters may be stored in a data repository (e.g., the data repository 150) and used by the MAA 125 for the purpose of, for example, determining if the third-party application is malicious or not, based on the cluster(s) to which the third-party application relates.

In the event that third-party application 140 is determined to be suspicious or malicious, an appropriate security risk mitigation action may be taken so as to prevent it from doing damage. For example, its operation may be blocked or terminated, future instances may be prevented from being created, or it may be permanently enjoined from accessing sensitive or confidential data.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for agentless monitoring of third-party applications, the method comprising:
   initiating by a monitoring agentless application (MAA) executing on a computer a service instance in a cloud-based computing environment of a software as a service (SaaS) having characteristics including on-demand self-service, broad network access, resource pooling, rapid elasticity, and measured service;
   providing to a third-party application, application access credentials for use in accessing the service instance, wherein the application access credentials are generated and provided by the MAA and not shared with or controlled by any logging agents or external indexing appliances; and
   extracting and monitoring, in real-time and without indexing or retrieving virtual images or snapshots, in a supervised environment, by the MAA, behavior data from the service instance based on at least an action performed by the third-party application directly within the service instance using selective network-traffic mirroring via software-defined networking (SDN), wherein the extracting and monitoring does not include inserting executable management code into the third-party application or the service instance, does not rely on external log files, and does not involve retrieval or analysis of stored image of virtual servers, thereby maintaining privacy and reducing processing overhead.

2. The method of claim 1, wherein the MAA makes available a combination of one of one or more bots and simulated information thereof for use by the third-party application as if it is, but in lieu of, real information.

3. The method of claim 1, further comprising:
   generating, by the MAA, a monitor log that contains the behavior data.

4. The method of claim 1, wherein the service instance is created for and associated with a unique entity.

5. The method of claim 1, wherein the service instance is implemented as a container.

6. The method of claim 5, wherein the container operates in a cluster deployed by a server of a provider of the SaaS.

7. The method of claim 1, further comprising:
   determining if the service instance is suspicious based on the behavior data.

8. The method of claim 7, further comprising:
   when the service instance is determined to be suspicious, performing a damage prevention mitigation action with respect to the suspicious service instance.

9. A non-transitory computer readable medium having stored thereon instructions for causing a processing circuitry to execute a process for agentless monitoring of third-party applications, the process comprising:
   initiating by a monitoring agentless application (MAA) executing on a computer a service instance in a cloud-based computing environment of a software as a service (SaaS) having characteristics including on-demand self-service, broad network access, resource pooling, rapid elasticity, and measured service;
   providing to a third-party application, application access credentials for use in accessing the service instance, wherein the application access credentials are generated and provided by the MAA and not shared with or controlled by any logging agents or external indexing appliances; and
   extracting and monitoring, in real-time and without indexing or retrieving virtual images or snapshots, in a supervised environment, by the MAA, behavior data from the service instance based on at least an action performed by the third-party application directly within the service instance using selective network-traffic mirroring via software-defined networking (SDN), wherein the extracting and monitoring does not include inserting executable management code into the third-party application or the service instance, does not rely on external log files, and does not involve retrieval or analysis of stored images of virtual servers, thereby maintaining privacy and reducing processing overhead.

10. A system for agentless monitoring of third-party applications, comprising:

a processing circuitry; and a memory, the memory containing instructions that, when executed by the processing circuitry, configure the system to:

initiate, by a monitoring agentless application (MAA), a service instance in a cloud-based computing environment of a software as a service (SaaS) having characteristics including on-demand self-service broad network access resource pooling, rapid elasticity, and measured service;

provide, to a third-party application by the MAA and not shared with or controlled by any logging agents or external indexing appliances, application access credentials for use in accessing the service instance; and extract and monitor, in real-time and without indexing or retrieving virtual images or snapshots, in a supervised environment, by the MAA, behavior data from the service instance based on at least an action performed by the third-party application directly within the service instance using selective network-traffic mirroring via software-defined networking (SDN), wherein the extracting and monitoring does not include inserting executable management code into the third-party application or the service instance, does not rely on external log files, and does not involve retrieval or analysis of stored images of virtual servers, thereby maintaining privacy and reducing processing overhead.

11. The system of claim 10, wherein the MAA makes available simulated information for use by the third-party application as if it is, but in lieu of, real information.

12. The system of claim 10, wherein the system is further configured to:

generate, by the MAA, a monitor log that contains the behavior data.

13. The system of claim 10, wherein the MAA initiates the instance of the SaaS via an application programing interface (API) of the SaaS.

14. The system of claim 10, wherein the service instance is created for and associated with a unique entity.

15. The system of claim 10, wherein the service instance is implemented as a container.

16. The system of claim 15, wherein the container operates in a cluster deployed by a server of a provider of the SaaS.

17. The system of claim 10, wherein the system is further configured to: determine if the service instance is suspicious based on the behavior data.

18. The system of claim 17, wherein the system is further configured to:

perform a mitigation action with respect to the service instance, when the service instance is determined to be suspicious.

\* \* \* \* \*